April 29, 1969      A. BOYLES      3,440,868

METHOD FOR TESTING DUCTILE IRON CASTINGS

Filed Sept. 26, 1966

INVENTOR
ALFRED BOYLES

BY Paul J. Ausbeck

ATTORNEY

United States Patent Office 3,440,868
Patented Apr. 29, 1969

3,440,868
METHOD FOR TESTING DUCTILE
IRON CASTINGS
Alfred Boyles, Burlington, N.J., assignor to United States
Pipe and Foundry Company, Birmingham, Ala., a corporation of New Jersey
Filed Sept. 26, 1966, Ser. No. 581,880
Int. Cl. G01n 3/30
U.S. Cl. 73—88        4 Claims

ABSTRACT OF THE DISCLOSURE

The invention relates to a qualifying test for ductile iron pipe and in general terms comprises pushing a hard steel ball into the surface of the pipe being tested with sufficient force to cause failure if it does not have the proper metallurgical structure and physical properties to meet the specifications to which the pipe are manufactured.

---

The invention relates to the testing of ductile iron castings to determine if they qualify as ductile iron castings. In general terms the invention comprises pushing a steel ball into the surface of castings with sufficient force to cause failure in any casting that does not have the proper metallurgical structure or sufficient physical properties to meet the specifications for the casting.

The invention is one of general application but has particular application in the manufacture of ductile iron pressure pipe and will be described herein in connection with such use for purposes of illustration.

The specifications for ductile iron pipe, ASA A21.51, require metal in the pipe which has 60,000 p.s.i. ultimate tensile strength, 42,000 p.s.i. yield strength and 10% elongation (60–42–10). The cost of cutting a tensile specimen from each pipe and pulling such specimen to determine if the pipe qualifies is prohibitive. Accordingly, many attempts have been made to devise an empirical test which could be correlated to the tensile test results and which would be more economical. Such tests are used to test each pipe and tensile specimens are then taken only on a periodic basis.

One such test which is in use and which gives very satisfactory results insofar as reliability is concerned is the ring crushing test. A one-inch ring is cut from the end of each pipe and it is deformed by a diametrical load until it fails. The amount of deflection required to cause failure gives an indication of the tensile and elongation properties of the metal, for example, within a predetermined thickness range a deflection of .50" or more for a six inch pipe establishes that it will meet the 10% elongation requirement. Although reliable, this test is undesirable because of the expense involved in cutting off the ring, the loss of the length of the ring from each pipe, and the unsuitability of the test for production line testing.

The object of the present invention is to provide a test which is carried out on the casting, which does not destroy good castings, which is economical, and which is suitable for use on a production line basis.

Figure 1:
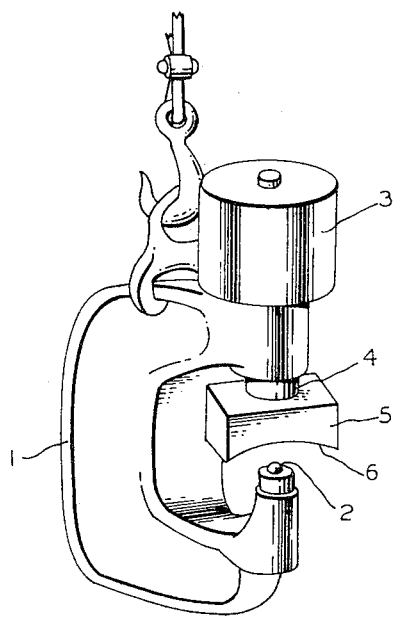
Figure 2:
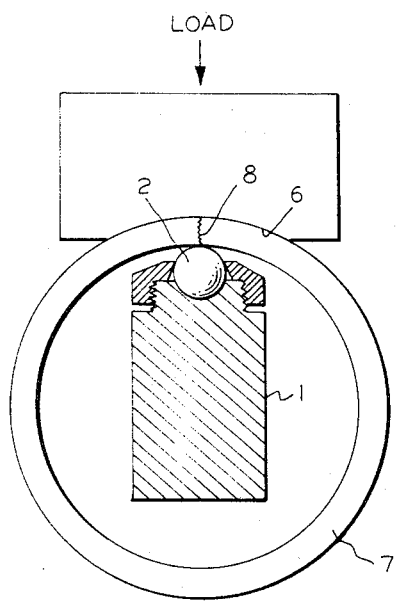

Further objects, features and advantages of the invention will be apparent from the following description reference being made to the accompanying drawings in which:

FIGURE 1 illustrates a portable press of the type used for squeezing rivets which has been adapted for pressing the test ball into the inside surface of a ductile iron pressure pipe, and FIGURE 2 illustrates the use of such an apparatus for testing pipe.

The invention is based upon the discovery that structures containing flake graphite, or large amounts of pearlite, will fail when subjected to a large force concentrated on a small area of the casting whereas with a substantially ferritic spheroidal graphite iron the casting will deform and will not fail. When a ball is pressed into the surface of a gray iron casting the casting will split if the load reaches sufficient magnitude, but when a ductile iron casting is subjected to the same test the metal flows (cold work) around the ball and the ball makes a spherical depression in the casting without producing cracks. After such a test the ductile iron casting is not damaged from a service standpoint.

FIGURE 1 shows a portable hydraulic punch of the type commonly used for squeezing rivets which has been adapted for carrying out the present invention. The press comprises a frame 1 which has a working surface on which ball 2 is mounted. Opposite ball 2, the frame supports a hydraulic cylinder 3 which operates a punch 4 on which an anvil 5 is mounted. The surface 6 of the anvil is curved to fit the outside surface of the pipe to be tested, and the anvil is of sufficient hardness to prevent deformation during use. Such a unit can easily be made by modifying a standard portable power punch, for example, a W. A. Whitney Mfg. Co. portable power punch having a fifty ton capacity, 1⅜" stroke and 2½" depth of throat. In order to obtain the desired speed of operation for production line testing, the apparatus should be powered by a hydraulic unit capable of producing the desired load in a few seconds.

The test is very simple to carry out and may be done very rapidly. As illustrated in FIGURE 2, the test is carried out on pipe 7 merely by placing the ball 2 inside the end of the pipe and applying the desired load to anvil 5 which in turn presses the pipe downward against the ball 2. If the pipe does not have the desired properties, it will split where the ball is pushed into its surface. On the other hand, when a good pipe is tested, the ball forces the metal to deform and flow without cracking the pipe. The curved surface 6 of the anvil prevents the pipe from being deformed to an oval shape, and the hard material of the anvil prevents the metal from bulging on the outside surface of the pipe opposite the ball impression on the inside surface. If the test is made about ¾" from the end of the pipe, the ball impression will be inside the gasket of the joint used to connect such pipe. As a result, the tested area will not be relied upon to withstand fluid pressure in the line.

To try out the test method in the laboratory a number of gray and ductile iron pipe made in the laboratory were tested with the following results:

TABLE I.—6" PIPE TESTED WITH A ⅝" DIA. BALL

| | Wall (in.) | |
|---|---|---|
| Regular gray iron | .35 | Failed at 2,800 to 3,400 lb. (7 tests). |
| Ductile iron (0% pearlite). | .35 | No failure at 10,000 to 25,000 lb. |
| Ductile iron (10% pearlite). | .36 | No failure at 10,000 to 25,000 lb. |
| Ductile iron (25% pearlite). | .34 | No failure at 10,000 to 25,000 lb. |
| Ductile iron (30% pearlite). | .37 | No failure at 10,000 to 25,000 lb. |

The gray iron pipe split at low pressures while the ductile iron showed no splits at loads up to 25,000 lb. Microexamination of sections cut through the ball impressions of the ductile pipe showed no splits whatever even on a micro scale. The metal simply flowed under the pressure of the ball. No surface grinding or preparation of any kind was done on these pipe prior to testing. At 25,000 lb. the ball impression was about 5/16" dia. by .05"

deep. With a curved anvil there was no distortion of spigot roundness.

Samples of regular production pipe of ductile iron were gathered. These were in the form of pieces about 6" square cut from the spigots of large diameter pipe. The results of tests on these samples are shown in Table II.

To evaluate the test as a production tool, provision was made to carry out experimental tests on a production line where the test could be compared with those obtained with the ring test being used for qualifying ductile iron pipe. The data obtained indicates that the ball penetration test is a suitable test for qualifying ductile iron pipe.

TABLE II.—PHYSICAL TEST REPORT

| Pipe No. | Pipe size (in.) | Tensile Test | | Elong., percent | Wall (in.) | Micro-structure | Load (lb.) | Result |
| --- | --- | --- | --- | --- | --- | --- | --- | --- |
| | | Yield S. | Ult. S. | | | | | |
| 1 | 20 | 50,100 | 73,800 | 20 | .56 | D.I. | 40,000 | O.K. |
| 2 | 20 | 50,700 | 70,200 | 23 | .54 | D.I. | 40,000 | O.K. |
| 3 | 20 | 47,300 | 67,300 | 25 | .55 | D.I. | 40,000 | O.K. |
| 4 | 20 | 53,000 | 68,000 | 27 | .54 | D.I. | 40,000 | O.K. |
| 5 | 20 | 50,300 | 69,100 | 26 | .52 | D.I. | 40,000 | O.K. |
| 6 | 20 | 49,700 | 67,300 | 25 | .56 | D.I. | 40,000 | O.K. |
| 7 | 20 | No yield | 33,700 | 0 | .67 | G.I. | 29,500 | Failed. |
| 8 | 16 | No yield | 25,900 | 0 | .72 | 50% gray | 23,000 | Do. |

All the ductile iron pipe (1–6) withstood 40,000 lb. without any sign of cracking. The two bad pipe, 7 which was gray iron and 8 which was 50% gray, split under much lower loads although they were thicker. Because of the heavy wall of these pipe they were tested with a larger ball, $15/16"$ dia., as compared to the $5/8"$ ball used on the 6" pipe. Although the tool used in the tests herein described was a hard ball, it is obvious that the size of the tool can be varied to suit the conditions and other shapes such as blunt cones and truncated pyramids would give suitable results.

A good assortment of test pieces in 4" and 8" pipe sizes, some of which were of the 50% gray type, were collected. These were rings about 5" long cut from pipe spigots. Ball tests were made with a $5/8"$ diameter ball using anvil blocks of soft steel with the results listed in Table III.

During these production line tests, a total of 8,648 ductile iron pipe 10" and less in diameter were subjected to the ball penetration tests as well as the ring test. In the initial phase of the test program a $5/8"$ diameter ball was used with test loads varying from 23,700 lb. to 82,950 lb. At the lower test loads the "ball" test failed to detect pipe which later failed the ring test. However, as the load was increased the ball test produced failures in pipe that also failed the ring test. At the higher loads an objectionable raised area, "bump," was produced on the outside of the pipe and in view of this, a $15/16"$ diameter ball was substituted to further evaluate this test method.

Utilizing a $15/16"$ diameter ball and applying the load approximately 3/4" from the spigot face, a total of 5,318 ductile iron pipe were subjected to both the ball test and the ring test. Test loads were varied from 47,400 lb. to 59,250 lb. Failures were produced in approximately 1.4%

TABLE III

| Pipe No. | Size (in.) | Percent elong. | Structure | Wall (in.) | Ball test load, lbs. | |
| --- | --- | --- | --- | --- | --- | --- |
| | | | | | Soft anvil | Hard anvil |
| 9 | 8 | 0 | 91% G.I. | .40 | 37,000 failed | 31,400 failed. |
| 10 | 8 | 1.0 | | .45 | 33,800 failed | 36,600 failed. |
| 11 | 8 | 0.5 | 86% G.I. | .39 | 35,300 failed | 46,000 failed. |
| 12 | 8 | 1.5 | 82% G.I. | .44 | 40,000 OK 45,800 failed. | 39,000 failed. |
| 13 | 8 | 4.0 | 32% G.I. | .40 | 40,000 OK, 62,000 failed. | 50,400 failed. |
| 14 | 8 | 23 | 100% D.I. | .41 | 40,000 OK, 70,000 OK. | 70,000 OK. |
| 15 | 8 | 22.5 | 100% D.I. | .41 | 40,000 OK, 70,000 OK. | 70,000 OK. |
| 16 | 4 | 0.5 | 93% G.I. | .41 | 28,600 failed | 30,000 failed. |
| 17 | 4 | 0.5 | 89% G.I. | .42 | 38,150 failed | 32,400 failed. |
| 18 | 4 | 1.0 | 90% G.I. | .41 | 39,000 failed | 29,600 failed. |
| 19 | 4 | 18 | 100% D.I. | .32 | 40,000 OK, 60,000 OK. | 60,000 OK. |
| 20 | 4 | 20 | 10% G.I. | .38 | 40,000 OK, 60,000 OK. | 60,000 OK. |
| 21 | 4 | 16 | 100% D.I. | .29 | 40,000 OK, 60,000 OK. | 60,000 OK. |

The pipe of special interest in this table are No. 12 with 1.5% elongation and No. 13 with 4% elongation. These pipe, which are in the border region between ductile and gray iron, are now weeded out by such tests as the above mentioned ring crushing test. No. 12 with 46,800 ultimate and 1.5% elongation failed at 45,800 lb. No. 13 with 58,100 ultimate and 4.0% elongation failed at 62,000 lb. The good ductile pipe No. 14 and 15 withstood 70,000 lb. without cracking.

In the 4" pipe, those with low tensile and elongation all failed at loads of 39,000 lb. or less while the good ductile pipe withstood 60,000 lb. although they were thinner. It was noted in using the soft anvil blocks that a bump was pushed up on the outside of the pipe because of deformation of the anvil under the higher loads. New anvil blocks of hardened tool steel were made up and the specimens were retested on the opposite end with the results given in Table III under the heading "Hard Anvil." The hard anvil blocks eliminated the bump on the outside and the pipe remained round. With the hard anvils, 5 pipe failed at lower loads while 3 pipe failed at higher loads than previously, but the test still picked out the bad pipe.

of the 5,318 pipe ball tested which later passed the ring test. This percentage decreased, however, as the load was decreased from 59,250 lb. to 47,400 lb. At a test load of 59,250 lb., 2.5% of the pipe failed the ball test but passed the ring test whereas at 47,400 lb. only 0.6% failed the ball test and passed the ring test. This clearly indicates that the ball test can be calibrated to equal the ring test in accuracy. It is significant that none of the pipe which passed the ball test failed the ring test. The data are tabulated in Table IV.

TABLE IV

| Ball diameter (in.) | Test load, lb. | No. of pipe failed ball passed ring | No. of pipe failed ball failed ring | No. of pipe passed ball failed ring | Total pipe tested |
| --- | --- | --- | --- | --- | --- |
| 15/16 | 59,250 | 17(2.5%) | 13 | 0 | 682 |
| 15/16 | 54,510 | 20(2.4%) | 2 | 0 | 844 |
| 15/16 | 49,770 | 28(1.4%) | 4 | 0 | 2,067 |
| 15/16 | 47,400 | 10(0.6%) | 4 | 0 | 1,725 |
| Total | | 75(1.4%) | 23 | 0 | 5,318 |

Since metal thickness would be a factor in evaluating this test method, this information was obtained. The 23 pipe which failed both the ball and ring test and shown in the above data had metal thicknesses which ranged from .32″ to .45″, and pipe with metal thicknesses of as high as .57″ were tested and passed both the ball and ring tests. This indicates that moderate variations in wall thickness will not adversely affect the ball test. However, it is to be expected that large variations in wall thickness would have to be taken into account when making the test.

The tests clearly show that the test method can be a reliable tool over a reasonably wide range of metal thicknesses, and that satisfactory results can be obtained if the ball size and load applied are selected to take in account metal thickness, physical properties of the metal and degree of precision required.

1 claim:

1. The method for testing ductile iron pipe comprising: determining the concentrated load which will cause cracking in pipe which do not meet the established physical standards for the pipe, pressing a blunt tool into a surface of each pipe by applying said determined load while supporting the opposite surface of the pipe with an anvil, and examining the pipe to determine if the pipe failed in the area of the tool impression resulting from applying the load.

2. The method according to claim 1 wherein, the load is applied by pressing a hard ball into the pipe near one end thereof, and the supporting anvil has substantially the same radius of curvature as the pipe surface against which it is pressed.

3. The method according to claim 1 wherein the load is applied by pressing a hard ball into a surface near one end of the pipe.

4. The method for testing a ductile iron pipe cast to specifications requiring 60–42–10 metal to determine if it qualifies comprising pressing a hard ball of less than one inch in diameter into a surface of the pipe by applying a load of at least 40,000 pounds, supporting the opposite surface of the pipe with an anvil having a curvature substantially the same as the pipe surface against which it is pressed and examining the impression area to determine if the pipe failed.

References Cited

UNITED STATES PATENTS

| | | | |
|---|---|---|---|
| 2,565,424 | 8/1951 | Forssell | 73—94 |
| 2,671,421 | 3/1954 | Raven | 73—94 |

JAMES J. GILL, *Primary Examiner.*

J. W. MYRACLE, *Assistant Examiner.*

U.S. Cl. X.R.

73—81